(12) United States Patent
Chen et al.

(10) Patent No.: US 7,472,291 B2
(45) Date of Patent: Dec. 30, 2008

(54) METHOD AND APPARATUS FOR INTEGRATING ACPI FUNCTIONALITY AND POWER BUTTON FUNCTIONALITY INTO A SINGLE POWER KEY

(75) Inventors: Hung-Ming Chen, Taipei (TW); Bor-Tay Chen, Taipei (TW)

(73) Assignee: Shuttle Inc., Taipei (TW)

( * ) Notice: Subject to any disclaimer, the term of this patent is extended or adjusted under 35 U.S.C. 154(b) by 279 days.

(21) Appl. No.: 11/106,493

(22) Filed: Apr. 15, 2005

(65) Prior Publication Data

US 2006/0236132 A1    Oct. 19, 2006

(51) Int. Cl.
*G06F 1/00* (2006.01)
*G06F 1/26* (2006.01)
*G06F 1/32* (2006.01)

(52) U.S. Cl. ..................... 713/300; 713/320
(58) Field of Classification Search ............. 713/300, 713/320
See application file for complete search history.

(56) References Cited

U.S. PATENT DOCUMENTS 5,384,721 A * 1/1995 Joto .......................... 713/321
5,710,931 A * 1/1998 Nakamura et al. ........... 713/323
5,838,982 A * 11/1998 Cooper et al. ............... 713/300
6,125,449 A * 9/2000 Taylor et al. ................ 713/310
6,684,338 B1 * 1/2004 Koo .......................... 713/300
6,802,010 B1 * 10/2004 Kim et al. .................... 726/20
7,131,011 B2 * 10/2006 Westerinen et al. ......... 713/300
2006/0090090 A1 * 4/2006 Perng ......................... 713/320

* cited by examiner

Primary Examiner—Mark Connolly
(74) Attorney, Agent, or Firm—Muncy, Geissler, Olds & Lowe, PLLC

(57) ABSTRACT

A power-managing key apparatus uses a power key to integrate the function of ACPI management of computer hardware and hibernation on/off of operation system. A processor coupled to the power key detects pressing-time parameters of the power key and a current state of the computer. The processor sends a hardware signal to emulate ACPI power button function in order to power on/off computer and awake the computer from a power saving mode. The processor sends a software signal to an operation system of the computer to disable/enable a hibernation state. Therefore, the complicated power management performed by computer hardware and operation system can be simplified.

8 Claims, 3 Drawing Sheets

METHOD AND APPARATUS FOR INTEGRATING ACPI FUNCTIONALITY AND POWER BUTTON FUNCTIONALITY INTO A SINGLE POWER KEY

BACKGROUND OF THE INVENTION

1. Field of the Invention

The present invention relates to a power-managing key apparatus and a method for the same, especially to a power-managing key apparatus with one pressing key and having predefined pressing-time parameter to integrate the function of ACPI management of computer hardware and hibernation on/off of operation system to simplify the power management for computer, and a method for the same.

2. Description of Prior Art

As the progress of computer technology and the enhancement of computing power, the computer power management is important to enhance computer performance and save electrical power.

The conventional method of power management and control for computer includes the following two approaches. The power management can be performed by ACPI (Advanced Configuration and Power Interface) and power manage routine of BIOS. Moreover, the power management can also be performed by software hibernation approach.

The ACPI power management defines five sleep modes and a normal mode as the following:

S0: Normal mode where the computer is powered on;

S1: Standby mode, where CPU is supplied with power but not executing instruction and many peripherals cease operation;

S2: This mode is in the spec, but not usually implemented.

S3: Suspend to RAM: The data in RAM are suspended and the computer is in pseudo-power off (soft-off) state where the power is only supplied to RAM and other components are powered off.

S4: Suspend to Disk: The data in memory is saved to hard disk. The data is restored to memory when powering on. The contents of RAM are saved to disk and replaced on resume.

S5: Soft Off, power off immediately.

The above-mentioned power on/off or power saving mode enabling/disabling is controlled by a power button of computer. Therefore, the computer can be immediately powered off by operating the power button. Alternatively, the computer can also immediately resume to original status from power saving mode and skipping long booting process by operating the power button.

The software hibernation approach is provided by software operation system and used with another power button. The computer can fast enter a hibernation mode by pressing the power button. The computer can resume normal operation and skip booting process by pressing again the power button.

The above-mentioned two power management and power control approaches are simultaneously and independently present in computer and operated through different buttons. Therefore, the power on/off and power saving mode enabling/disabling are complicated operations for user.

SUMMARY OF THE INVENTION

The present invention provides a power-managing key apparatus with one pressing key and having predefined pressing-time parameter to integrate the function of ACPI management of computer hardware and hibernation on/off of operation system to simplify the power management for computer, and a method for the same.

Accordingly, the present invention provides a power-managing key apparatus using a power key to integrate the function of ACPI management of computer hardware and hibernation on/off of operation system. A processor is coupled to I/O controller chip of the computer and software operation system. The processor detects pressing-time parameters of the power key and a current state of the computer. The processor sends a hardware signal to emulate ACPI power button function in order to power on/off computer and awake the computer from a power saving mode. The processor sends a software signal to an operation system of the computer to disable/enable a hibernation state. Therefore, the complicated power management performed by computer hardware and operation system can be simplified.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
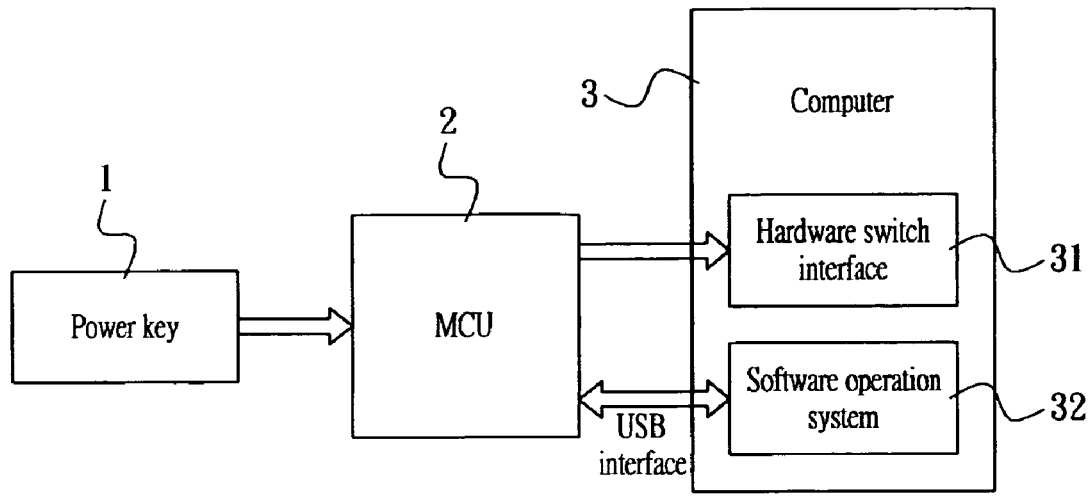
FIG. 1 shows a block diagram of power-managing key apparatus according to the present invention.
Figure 2:
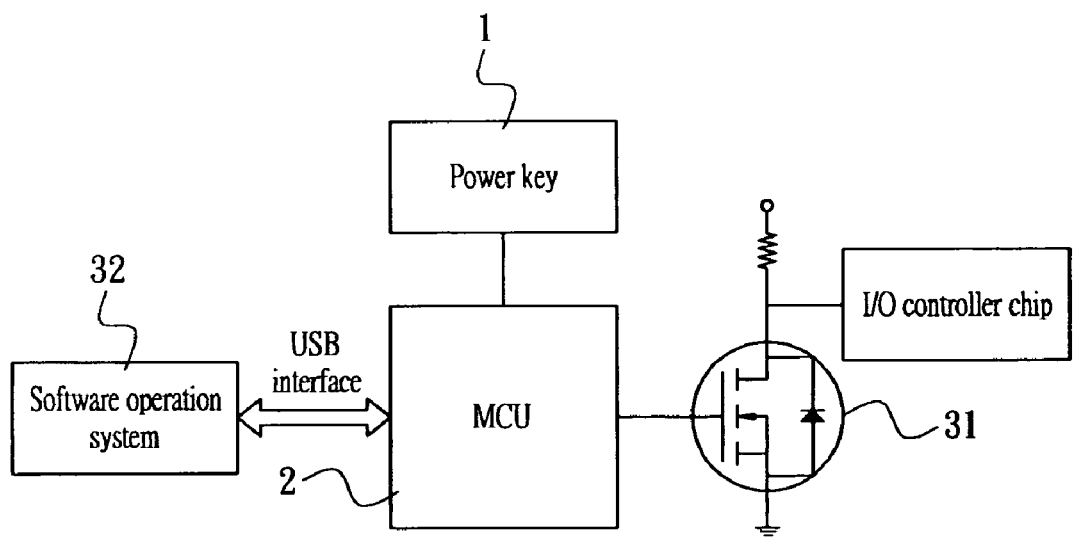
FIG. 2 shows another block diagram of power-managing key apparatus according to the present invention.

FIGS. 1 and 2 show block diagram of power-managing key apparatus according to the present invention. The power-managing key apparatus according to the present invention comprises a power key 1 connected to a micro controller unit (MCU) 2 for processing a key pressing-time parameter. The MCU 2 is connected to a hardware switch interface 31 of a computer 3 to send hardware instruction signal. The MCU 2 is also connected to a software operation system 32 of the computer 3 through a USB interface to send software instruction signal.

The power key 1, according to a preferred embodiment of the present invention, is a power button arranged on a motherboard of the computer 3. The power key 1 is integrated with the power button function provided by the hardware switch interface 31 on the motherboard supporting the ACPI function. The power key 1 is further integrated with the power button function provided by the software operation system 32 for enabling/disabling hibernation. The MCU 2 can monitor a time parameter when the power key 1 is pressed and then command to send hardware instruction signal or software instruction signal.

In one preferred embodiment of the present invention, the pressing-time parameters include a short-pressing signal when the pressing time of the power key 1 is about 1-2 seconds, and a long-pressing signal when the pressing time of the power key 1 exceeds 4 seconds.

In one preferred embodiment of the present invention, the MCU 2 is a USB controller, which receives a pressing signal of the power key 1 and the time parameter of a pressed state. The MCU 2 further judges the current power mode of the computer 3 and sends a hardware signal to the hardware switch interface 31 for performing S1-S5 operation modes defined by ACPI. The MCU 2 further sends a software signal to the software operation system 32 for enabling/disabling hibernation.

In one preferred embodiment of the present invention, the hardware switch interface 31 is an I/O controller chip arranged on a motherboard of the computer 3, as shown in FIG. 2. Therefore, the hardware switch interface 31 links a power button of the motherboard to the power key 1 of the present invention.

Figure 3:
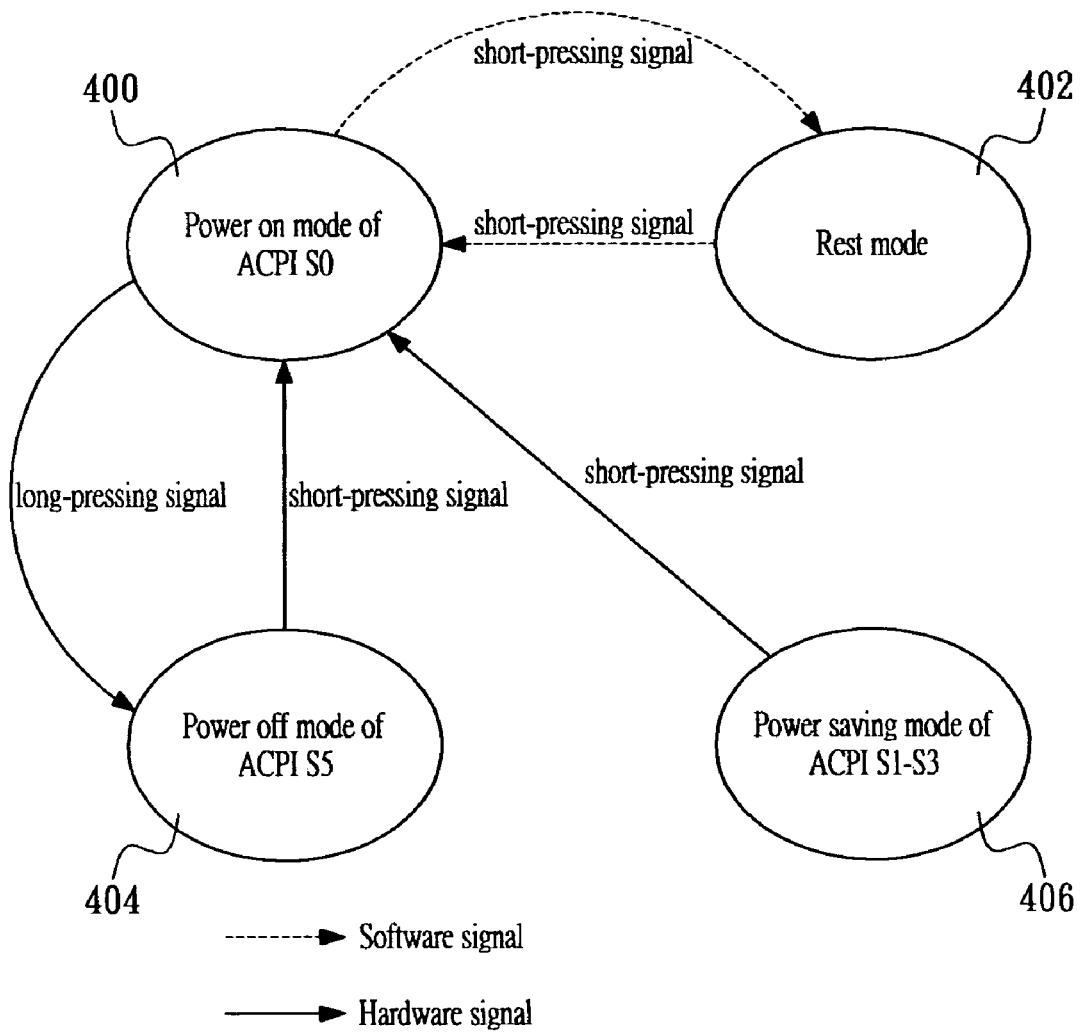
FIG. 3 shows a state diagram of the power management flow according to the present invention.

FIG. 3 shows a state diagram of the power management flow determined by a pressing-time parameter of the power key 1 integrated with power management function. The block 400 shows the computer 3 being turned on (Power on state as S0 state defined by ACPI), and the computer 3 can be operated to enter a hibernation mode performed by the software operation system 32 (AWAY mode in block 402) when a short-pressing signal is produced by operating the power key 1. Alternatively, the computer 3 can be operated to enter a power off mode defined by ACPI (mode in block 404) when a long-pressing signal is produced by operating the power key 1.

When the computer 3 is in power off mode (Turning off all supplied power), or when the computer 3 is in S1-S3 operation modes (such as block 406) defined by ACPI, the computer 3 can be resumed to the S0 power on state or work state by operating the power key 1 to produce a short-pressing signal.

Figure 4:
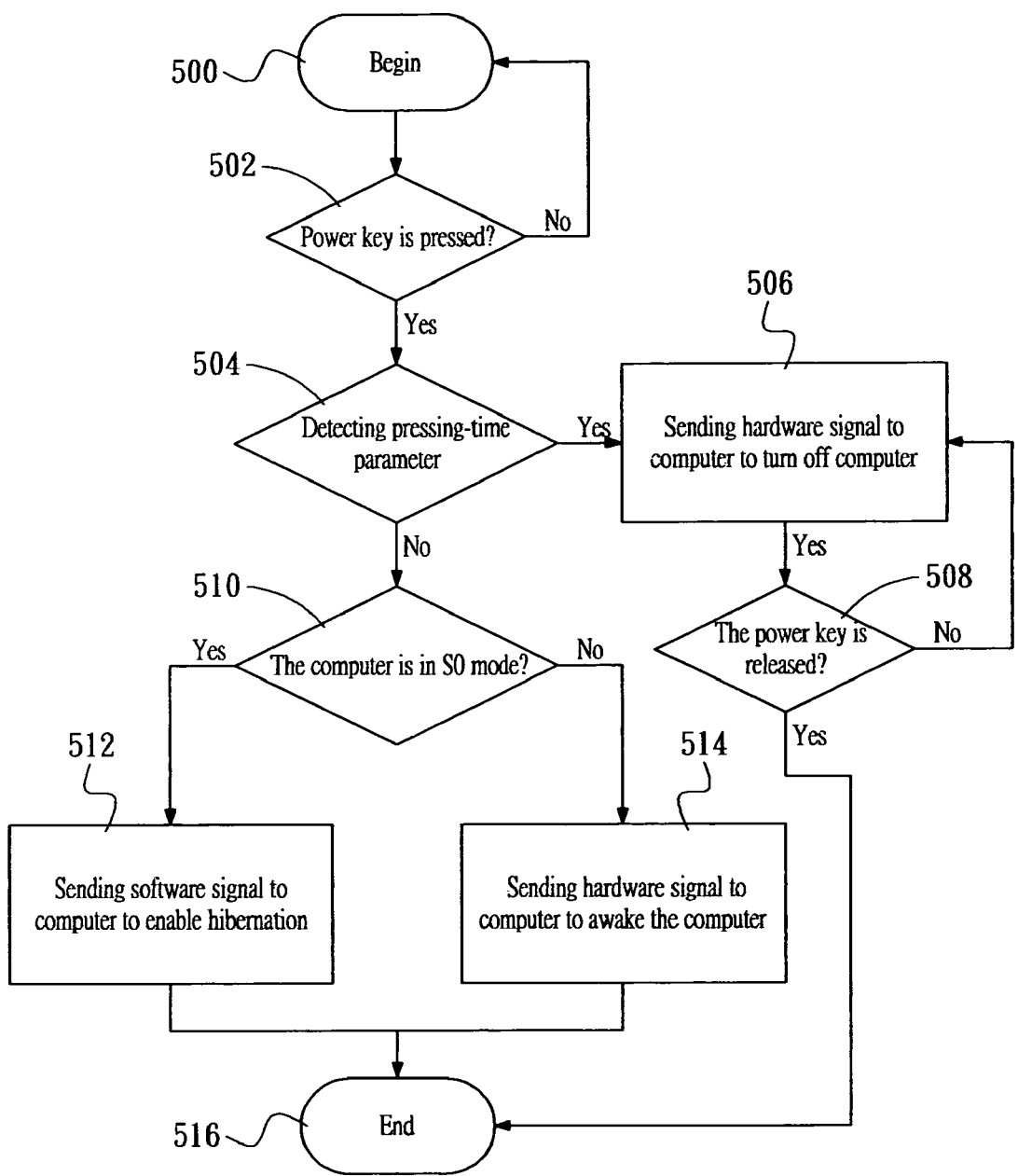
FIG. 4 is a flowchart for explaining the operation flow of the power-managing key apparatus according to a preferred embodiment of the present invention.

According to the above-mentioned preferred embodiment, the integrated key apparatus 1 for power management and the software/hardware control signal according to a pressing time of the integrated key apparatus 1 can be manifested by a flowchart shown in FIG. 4 with reference to the description thereof.

FIG. 4 is a flowchart for explaining the operation flow of the power-managing key apparatus according to a preferred embodiment of the present invention. In step 500, the computer 3 is turned on (Power on state as S0 state defined by ACPI), and the power key 1 is in an operable state.

Step 502 judges whether the power key 1 is pressed. If the power key 1 is pressed, then a step 504 judges whether the power key 1 is pressed to generate a short-pressing signal or a long-pressing signal. If the power key 1 is pressed to generate a long-pressing signal, namely the power key 1 is pressed for more than 4 seconds; the step 506 is executed. In step 506, a hardware signal is sent to the computer 3. The MCU 2 will keep sending the hardware signal until the power key 1 being detected in released state in step 508. Afterward, a step 516 is executed to end the operation of the power key 1.

In above-mentioned step 504, if the power key 1 is pressed to generate a short-pressing signal, then a step 510 is executed to judge whether the computer 3 is operated in power on state (as S0 state defined by ACPI). The short-pressing signal will toggle the computer 3 between a power on mode and a hibernation mode. When the computer 3 is operated in power on state and a short-pressing signal is generated, the MCU 2 sends a software signal to the software operation system 32 through the USB interface to drive the computer 3 into a hibernation mode in step 512. When the power key 1 is pressed to generate a short-pressing signal again, the computer 3 is driven to exit the hibernation mode.

In the above step 510, when the computer 3 is operated in power saving mode or power off mode as defined by S1-S5 modes of ACPI, the short-pressing signal will awake the computer 3. The MCU 2 will send a hardware signal to the hardware switch interface 31 to emulate the function of ACPI power button in step 514. The computer 3 will promptly resume original function without time-consuming booting process.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A power-managing key apparatus, comprising a power key;
   a micro controller unit (MCU);
   a computer comprising
   a hardware switch interface connected to the MCU for receiving a hardware signal;
   a software operation system connected to the MCU for receiving a software signal; and
   the power key being integrated with a power button function provided by the hardware switch interface on the motherboard supporting ACPI function and is further integrated with a power button function provided by the software operation system for enabling/disabling hibernation; and
   the power-managing key apparatus generating one of hardware signal and software signal according to pressing-time parameters and a current status of the computer.

2. The power-managing key apparatus as in claim 1, wherein the power key is a power button on a motherboard of the computer.

3. The power-managing key apparatus as in claim 1, wherein pressing-time parameters comprise a short-pressing signal when a pressing time of the power key is about 1-2 seconds, and a long-pressing signal when a pressing time of the power key exceeds 4 seconds.

4. The power-managing key apparatus as in claim 1, wherein the MCU is a USB controller.

5. The power-managing key apparatus as in claim 1, wherein the hardware switch interface is an I/O controller chip.

6. A method for operating a power-managing key apparatus, comprising the steps of:
   setting a computer in power on state and setting a power key in an operable state;
   detecting a pressing state of the power key;
   judging a pressing-time parameter to be a short-pressing signal or a long-pressing signal;
   sending a hardware signal to the computer to power off the computer when the long-pressing signal is detected;
   judging whether the computer is in power on state (S0 mode of APCI) when the short-pressing signal is detected;
   operating a software operating system to drive the computer into a hibernation mode when the computer is in power on state (S0 mode of APCI);
   performing an awaking operation by emulating an ACPI function to awake the computer when the computer is in power off state or power-saving mode defined by S1-S5 modes of ACPI;

an MCU connected to a hardware switch interface and the software operation system and generating one of hardware signal and software signal according to pressing-time parameters and a current status of the computer and sending the hardware signal or the software signal to the computer, whereby an ACPI operation is emulated by the hardware switch interface or a hibernation is enabled/disabled by the software operation system;

sending a hardware signal to the computer for powering off the computer when the long-pressing signal is detected; and powering off the computer when detecting a releasing of the power key.

7. The method as in claim 6, further comprising:

the MCU sending a software signal to a the software operation system of the computer through a USB interface to drive the computer to enter or exit a hibernation state.

8. The method as in claim 6, further comprising:

the MCU sending a hardware signal to the computer and the hardware switch interface to emulate a power button function of ACPI, whereby the computer resumes to an original status.

* * * * *